US012688236B2

(12) United States Patent
Gupta et al.

(10) Patent No.: US 12,688,236 B2
(45) Date of Patent: Jul. 21, 2026

(54) DEPLOYMENT INFRASTRUCTURE FOR SHARING USAGE METRICS WITH CUSTOMERS

(71) Applicant: SNOWFLAKE INC., Bozeman, MT (US)

(72) Inventors: Dhiraj Gupta, San Mateo, CA (US); Laszlo Kovacs, Los Altos Hills, CA (US); Subramanian Muralidhar, Mercer Island, WA (US); Souptik Sen, San Mateo, CA (US); Dangfu Wang, Fremont, CA (US)

(73) Assignee: Snowflake Inc., Bozeman, MT (US)

( * ) Notice: Subject to any disclaimer, the term of this patent is extended or adjusted under 35 U.S.C. 154(b) by 189 days.

(21) Appl. No.: 18/452,189

(22) Filed: Aug. 18, 2023

(65) Prior Publication Data

US 2025/0061473 A1 Feb. 20, 2025

(51) Int. Cl.
*G06F 16/90* (2019.01)
*G06F 16/9032* (2019.01)

(52) U.S. Cl.
CPC ................................ *G06F 16/9032* (2019.01)

(58) Field of Classification Search
CPC .................................................. G06F 16/9032
See application file for complete search history.

(56) References Cited

U.S. PATENT DOCUMENTS

| | | | | |
|---|---|---|---|---|
| 10,628,415 | B1 * | 4/2020 | Rajaperumal | G06F 16/2393 |
| 11,216,580 | B1 * | 1/2022 | Holboke | G06F 21/6245 |
| 11,669,630 | B1 * | 6/2023 | Arikatla | G06F 21/6218 |
| | | | | 726/1 |
| 2019/0370484 | A1 * | 12/2019 | Klein | G06F 21/6227 |

* cited by examiner

*Primary Examiner* — Kristopher Andersen
(74) *Attorney, Agent, or Firm* — Schwegman Lundberg & Woessner, P.A.

(57) ABSTRACT

A deployment infrastructure for sharing usage metrics with customers is described. An example method includes transforming a usage view file into an anonymous block build file. The usage view file corresponds to a view of customer usage data. The method includes embedding the anonymous block build file into a task, and executing the task to produce a share object that is based on the anonymous block build file. The method includes deploying the share object to a customer account, which enables the customer account to access the view of the customer usage data.

20 Claims, 6 Drawing Sheets

500 →

500

600 —

DEPLOYMENT INFRASTRUCTURE FOR SHARING USAGE METRICS WITH CUSTOMERS

TECHNICAL FIELD

Aspects of the present disclosure relate to sharing usage metrics, and more particularly, to a deployment infrastructure for sharing usage metrics with customers.

BACKGROUND

Cloud-based data storage and retrieval systems utilize cloud computing resources to efficiently manage, process, and analyze large volumes of data. These systems offer businesses and organizations the ability to securely store and access data on remote cloud servers, eliminating the need for on-premises hardware and infrastructure.

Cloud-based data storage and retrieval systems collect customer usage metrics for their own analysis and also to share with customers. Customer usage metrics include quantitative measurements that track and analyze how customers interact with the cloud-based data storage and retrieval system, encompassing factors such as data consumption rates, user activity, and resource utilization. Customers evaluate their usage metrics for managing costs, optimizing workflows, monitoring performance, resource allocation, capacity planning, security compliance, and etcetera.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
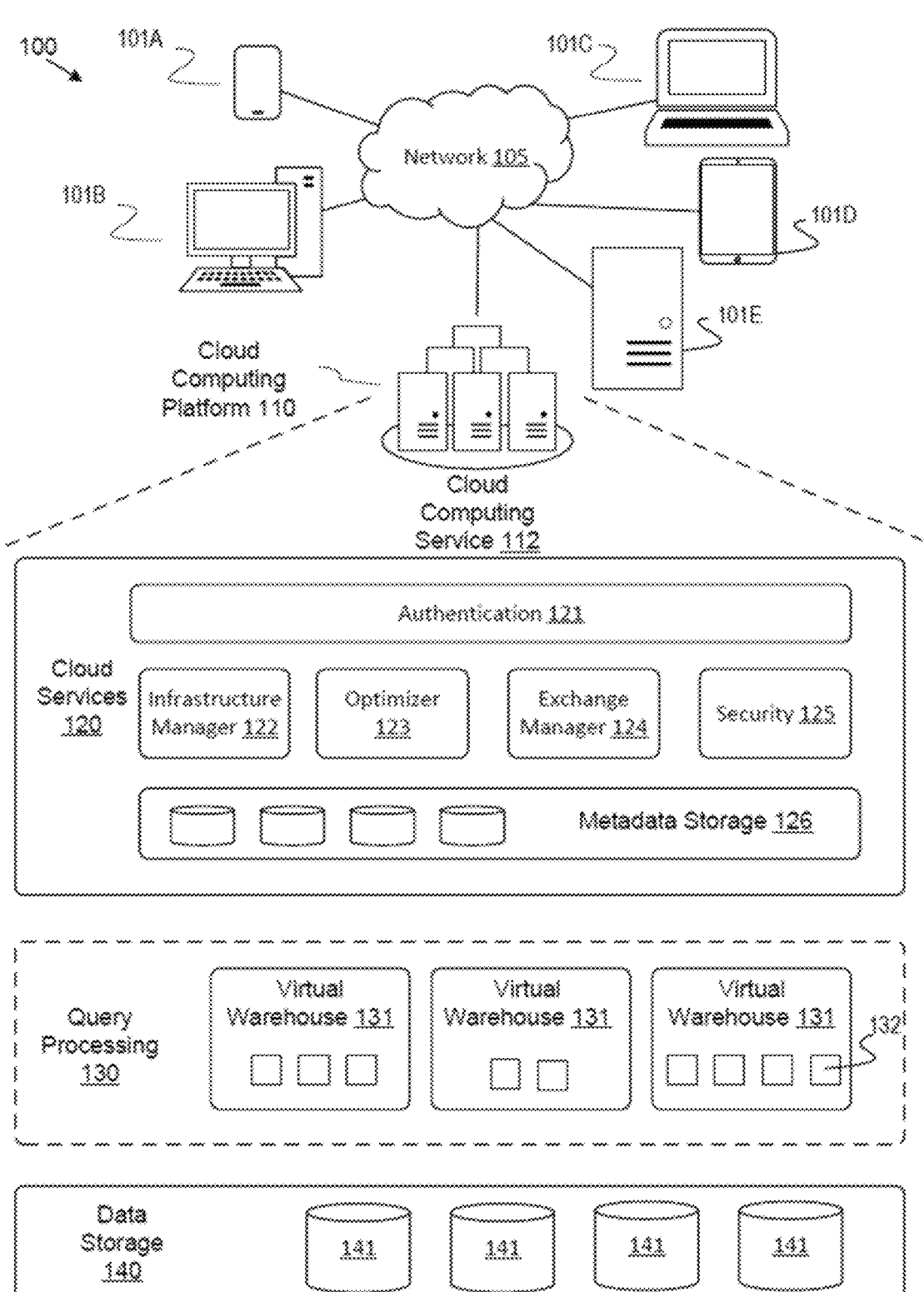
FIG. 1 is a block diagram of an example computing environment, in accordance with some embodiments of the present disclosure.

As discussed above, a cloud-based data storage and retrieval system collects customer usage metrics that customers use for various tasks. The cloud-based data storage and retrieval system typically provides customer usage metrics through views in the form of user interfaces or dashboards accessible to a customer, which are customized representations of their personal usage metrics.

Creating and deploying user-friendly and intuitive customer views requires careful design and usability testing. Developers typically design the views and manually individually deploy the views to each customer. One challenge found is finding a balance between a simple interface and enough detail for customers to make informed decisions. At times, this requires several deployment iterations to revise, add, and remove views. Another challenge found is allowing customers to customize their views without complexity, as each customer may have different requirements and preferences. Yet another challenge found is implementing interactive features and responsiveness into dashboards to ensure smooth user experiences while dealing with a large amount of data requires.

The present disclosure addresses the above-noted and other deficiencies by using a processing device to transform a usage view file into an anonymous block build file. The usage view file corresponds to a view of customer usage data. The processing device embeds the anonymous block build file into a task, and executes the task to produce a share object, which is based on the anonymous block build file. The processing device then deploys the share object to a customer account, which enables the customer account to access the view of the customer usage data. In some embodiments, the usage view file is a structured query language (SQL) file and the anonymous block build file includes independent SQL statements corresponding to the SQL file.

In some embodiments, the processing device adds a machine learning function into the anonymous block build file, which enables the customer account to invoke the machine learning function on the customer usage data when the share object is deployed to the customer account. In some embodiments, a local account deploys the share object to the customer account. The local account and the customer account reside in a same cloud region. In some embodiments, the processing devices adds share object version control to the anonymous block build file, which indicates removal of one or more previous share objects. In turn, the local account removes the previous share objects from the cloud region.

In some embodiments, a background service executes the task running in the cloud region. In some embodiments, the background service detects and retrieves a new anonymous block build file stored in a global services repository. The new anonymous block build file includes a new view of the customer usage data. The background service embeds the new anonymous block build file into a new task and executes the new task to produce a new share object. The local account then deploys the new share object to the customer account, which enables the customer account to access the new view of the customer usage data.

In some embodiments, the customer usage data is stored in a regional database. The customer account instantiates a customer database based on the share object, which virtualizes the customer usage data stored in the regional database. In some embodiments, the customer account receives a query request to perform a query on the customer database. The query is passed to the local account, where the local account performs the query on the regional database to produce a query result. In turn, the local account provides the query result to the customer account.

As discussed herein, the present disclosure provides an approach that improves the operation of a computer system by removing the need for error-prone manual deployments of updated usage views. In addition, the present disclosure provides an improvement to the technological field of cloud-based data storage and retrieval systems by providing a continuous deployment approach for developers to push new views and machine learning functionality to customer accounts.

FIG. 1 is a block diagram of an example computing environment 100, in accordance with some embodiments of the present disclosure. In particular, a cloud computing platform 110 may be implemented, such as AMAZON WEB SERVICES™ (AWS), MICROSOFT AZURE™, GOOGLE CLOUD™ or GOOGLE CLOUD PLATFORM™, or the like. The cloud computing platform 110 provides computing resources and storage resources that may be acquired (purchased) or leased and configured to execute applications and store data. The cloud computing platform 110 may be accessed by a client device 101. Non-limiting examples of client devices include a smart phone 101A, personal computer 101B, laptop 101C, tablet computer 101D, server computer 101E, and/or another type of device that can process data. FIG. 1 and the other figures may use like reference numerals to identify like elements. A letter after a reference numeral, such as "101A," indicates that the text refers specifically to the element having that particular reference numeral. A reference numeral in the text without a following letter, such as "101," refers to any or all of the elements in the figures bearing that reference numeral.

In some embodiments, client devices 101 may access the cloud computing platform 110 over a network 105. Network 105 may be a public network (e.g., the Internet), a private network (e.g., a local area network (LAN) or wide area network (WAN)), or a combination thereof. In one embodiment, network 105 may include a wired or a wireless infrastructure, which may be provided by one or more wireless communications systems, such as a WIFI hotspot connected with the network 105 and/or a wireless carrier system that can be implemented using various data processing equipment, communication towers (e.g., cell towers), etc. The network 105 may carry communications (e.g., data, message, packets, frames, etc.) between the various components of the cloud computing platform 110 and one more of the client devices 101.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as AMAZON S3 to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temporary data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution by compute nodes within elastic clusters of virtual machines, referred to herein as virtual warehouses or data warehouses. Thus, query processing 130 may include one or more virtual warehouses 131 having one or more compute nodes 132, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse 131 that expands, contracts, or shuts down according to the user's needs. Expanding a virtual warehouse 131 involves generating one or more compute nodes 132 to the virtual warehouse 131. Contracting a virtual warehouse 131 involves removing one or more compute nodes 132 from the virtual warehouse 131. More compute nodes 132 may lead to faster compute times. For example, a data load which takes fifteen hours on a system with four nodes might take only two hours with thirty-two nodes.

Cloud services 120 may be a collection of services (e.g., computer instruction executing on a processing device) that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, an authentication engine 121, an infrastructure manager 122, an optimizer 123, an exchange manager 124, a security engine 125, and/or a metadata storage 126.

In one embodiment, the cloud computing service 112 can perform a redaction operation on contents of the data in a data set of the cloud computing platform 110. In some embodiments, the redaction operation may include executing a machine learning operation to automatically recognize sensitive data within the data storage 140. In some embodiments, the redaction operation may be performed responsive to a command from a client device 101 of the cloud computing service 112, such as via a SQL statement. In some embodiments, the redaction operation may be triggered by one or more conditions within the cloud computing service 112, such as an automatic timer and/or a detection of a data modification to the data storage 140. Additionally, the cloud computing service 112 may generate an output data set of the redaction operation that may contain a redacted version of the sensitive data without altering the sensitive data within the data storage 140.

Figure 2:
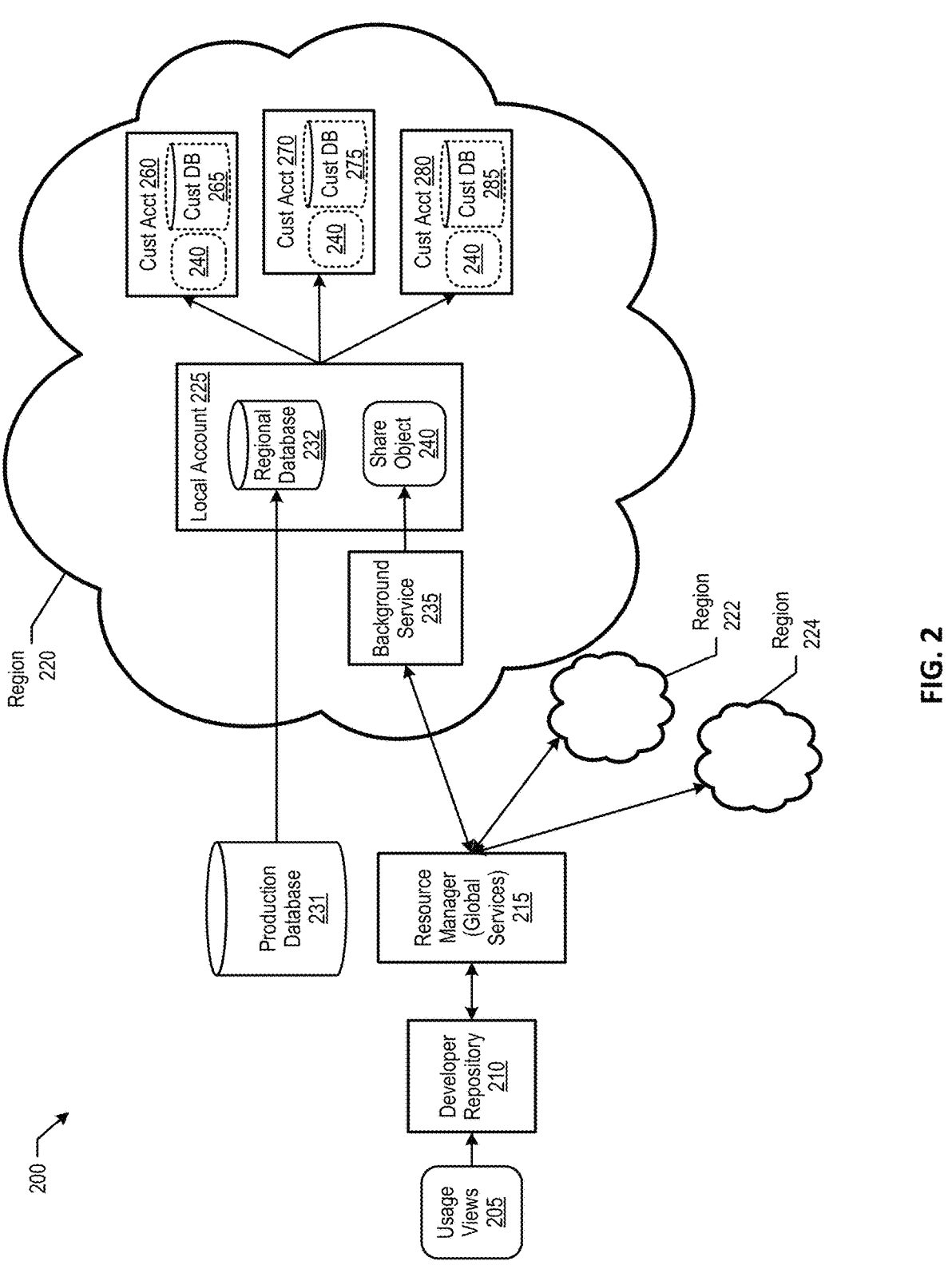
FIG. 2 is a block diagram that illustrates an example system for providing a continuous deployment approach for developers to push new views and machine learning functionality to customer accounts, in accordance with some embodiments of the present disclosure.

FIG. 2 is a block diagram that illustrates an example system for providing a continuous deployment approach for developers to push new views and machine learning functionality to customer accounts, in accordance with some embodiments of the present disclosure.

System 200 includes developer repository 210, resource manager 215, and cloud regions 220, 222, and 224. Each cloud region includes a background service (e.g., background service 235), a local account (e.g., local account 225), and customer accounts (e.g., customer accounts 260, 270, and 280). In some embodiments, cloud regions 220-224 support geographical locations (e.g., North American region, European region, etc.). Referring to cloud region 220, local account 225 includes regional database 232, which includes data and metadata for each of the customer accounts within region 220. In some embodiments, regional database 232 is updated with data from production database 231 (e.g., a global database). Each customer is able to view and perform queries on their particular data. In addition, as discussed herein, system 200 provides an approach of continuously deploying functions, such as machine learning functions, to customer accounts.

A developer creates usage views 205 and loads usage views 205 into developer repository 210. Usage views 205, in some embodiments, are a set of SQL files that define share objects. Share objects are objects that encapsulate information required to share a database with a customer. Resource manager 215 monitors developer repository 210 for new usage view loads. When resource manager 215 detects usage views 205 being loaded, resource manager 215 retrieves usage views 205 from developer repository 210 and transforms usage views 205 into an anonymous block build file. An anonymous block build file includes anonymous blocks, which are separate, standalone SQL statements based on usage views 205, and may include machine learning functions, share object version control information, or a combination thereof (see FIG. 3 and corresponding text for further details).

Background service 235 monitors a repository in resource manager 215 for new anonymous block build files. When background services 235 detects new anonymous block build files, background services 235 retrieves the anonymous block build file and inserts the anonymous block build file into a task. Background service 235 executes the task to produce share object 240 (see FIG. 3 and corresponding text for further details). Background service 235 provides share object 240 to local account 225.

Local account 225, or a background service, then instantiates share object 240 in each of customer accounts 260-280. In turn, the instantiated share objects 240 instantiates at the customer accounts instantiate a corresponding customer database (265, 275, 285). Customer databases 265, 275, and 285 are special system database present in customer accounts 260, 270, and 280, respectively, which has multiple views for exposing customer usage statistics. Customer databases 265, 275, and 285 also include executable functions, such as machine learning functions, data privacy functions, large language models (LLMs) for document understanding, and etc.

In some embodiments, views and functions are created on top of base tables from regional database 232 that include real production data from production database 231. These views and functions are added to the share object 240, and are then provided to the customer accounts in the same cloud region. In some embodiments, sharing data to the customer accounts is a zero copy share. A zero copy share does not materialize or copy data over to the individual customer accounts. As such, when a customer wishes to perform a query on their customer database, the query is passed back to local account 225, and local account 225 performs the query on regional database 230 to produce a query result. Local account 225 then passes the query result back to the corresponding customer account 260. In some embodiments, local account 225 places a filter condition (e.g., customer account id) for views, queries, and user-defined functions (UDFs).

Figure 3:
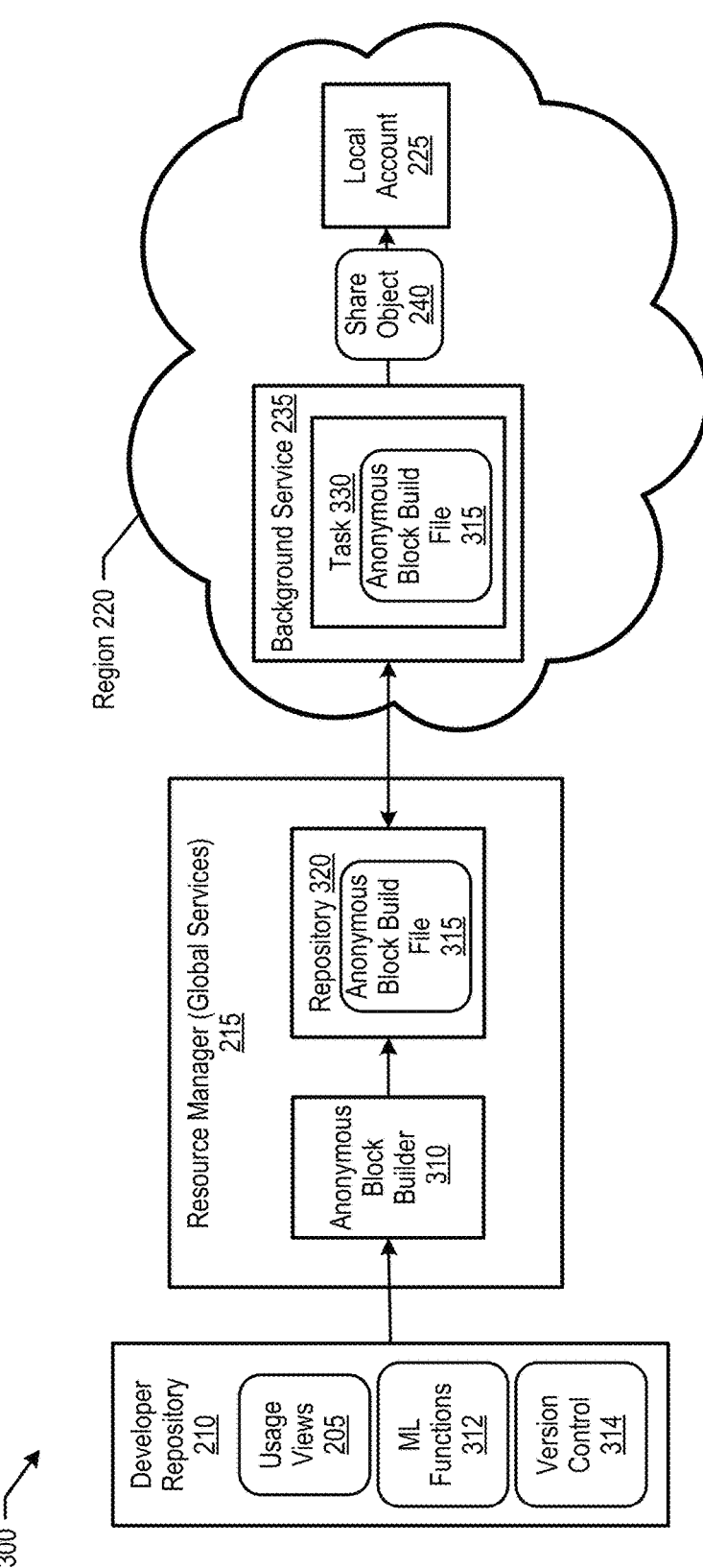
FIG. 3 is a block diagram that illustrates an example system for transforming usage views into an anonymous block build file and producing a share object from the anonymous block build file, in accordance with some embodiments of the present disclosure.

FIG. 3 is a block diagram that illustrates an example system for transforming usage views into an anonymous block build file and producing a share object from the anonymous block build file, in accordance with some embodiments of the present disclosure.

A developer creates usage views 205 and loads usage views 205 into developer repository 210. In some embodiments, the developer also creates machine learning functions 312 and includes machine learning functions 312 in developer repository 210. Machine learning functions 312, for example, allow customers to utilize pre-built or custom machine learning models to extract meaningful information, identify patterns, or make predictions from their customer usage data to facilitate data-driven decision-making and optimizing data management processes.

In some embodiments, the developer creates version control 314 and includes version control 314 in depository developer repository 210. Version control 314, for example, may include a list of objects to schedule for deletion. Version control 314 may also include a reference to a versioned object and instructions to drop the versioned object. In some embodiments, the developer may include guardrails so that version parameters are not referenced in an object on the deletion list.

Anonymous block builder 310 builds anonymous block build file 350 based on information included in developer repository 210. Anonymous block build file 315 includes anonymous blocks, instrumentation code, version control information, and machine learning functions (see FIG. 4 and corresponding text for further details). Anonymous block builder 310 stores anonymous block build file in repository 320.

Background service 235 monitors repository 320 in resource manager 215 for new anonymous block build files. When detected, background services 235 retrieves anonymous block build file 315 and inserts anonymous block build file 315 into a task 330. Background service 235 executes task 330 to produce share object 240. Background service 235 then provides share object 240 to local account 225.

In some embodiments, share object 240 includes usage views, dictionary object views, data privacy functions, machine learning functions (anomaly detection, forecasting, etc.). In some embodiments, the source data on which these views and functions are created is extracted from base tables in regional database 232. The base tables are created from regional database 232 continually ingesting metadata about usage and objects from production database 231.

In some embodiments, background services 235 is continuously running in each cloud region, checking for new releases in resource manager 215. In the event of a new release, background services 235 creates a new share object and passes the new share object to local account 225. In some embodiments, another background service in the cloud regions check for new share objects and instantiates updated customer databases from the new share objects accordingly.

Figure 4:
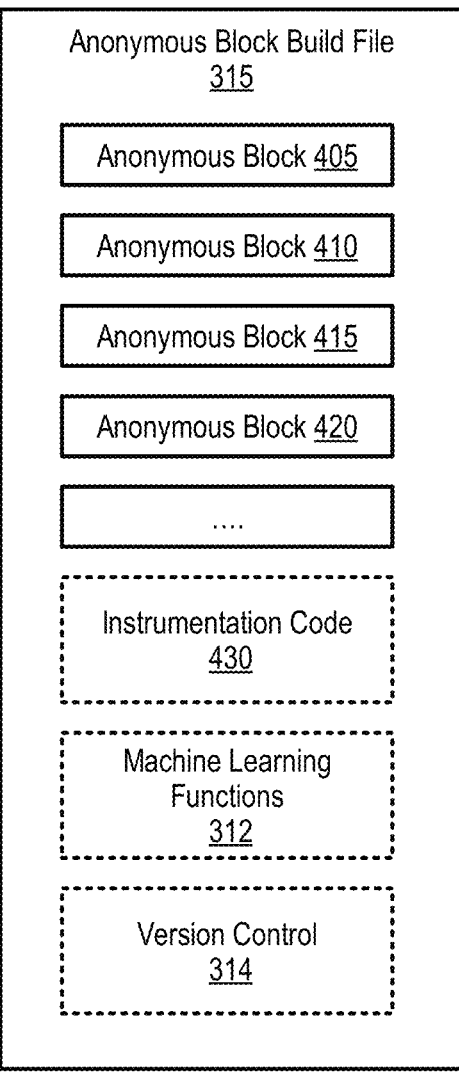
FIG. 4 is a block diagram that illustrates an example of an anonymous block build file, in accordance with some embodiments of the present disclosure.

FIG. 4 is a block diagram that illustrates an example of an anonymous block build file, in accordance with some embodiments of the present disclosure. During the building of anonymous block build file 315, SQL code in usage views SQL 205 is validated, traversed in order, and transformed into an anonymous block build file 315. Anonymous block build file 315 includes anonymous blocks 405-420, which are separate, standalone SQL statements based on usage views SQL 205. Anonymous blocks 405-420 are independent from a stored procedure and, as such, may be embedded into a task 330 and executed to produce share object 240.

In some embodiments, anonymous block build file 315 includes instrumentation code 430, machine learning functions 312, version control 314, or a combination thereof. Instrumentation code 430, machine learning functions 312, version control 314, or a combination thereof may be separate from anonymous block build file 315 and included in repository 320 for background services 235 to process.

Figure 5:
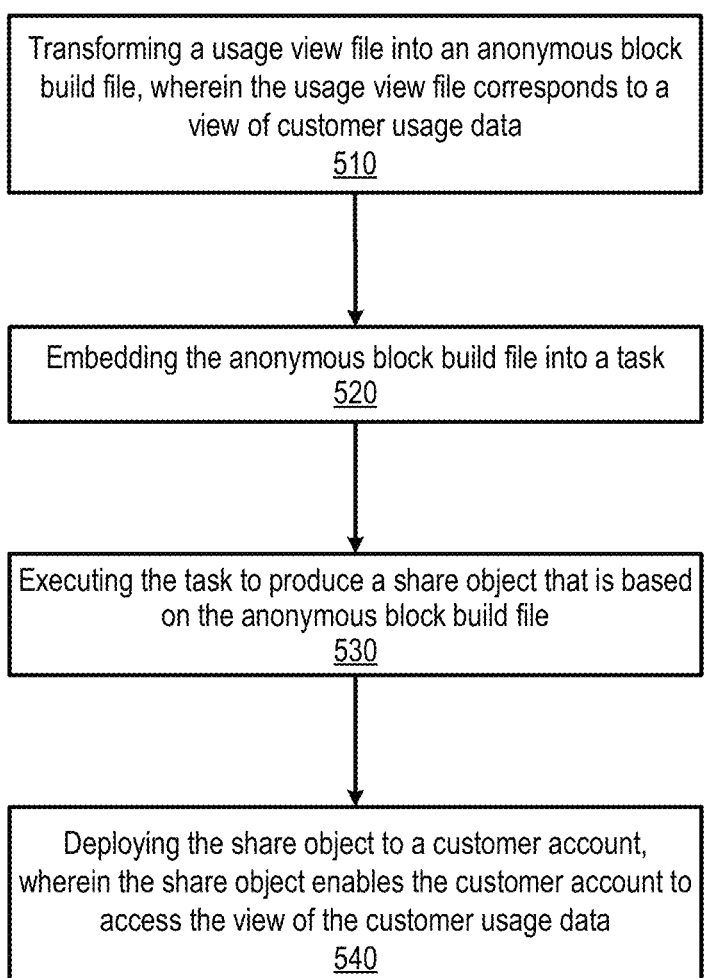
FIG. 5 is a flow diagram of a method of deploying a share object for sharing usage metrics with customers, in accordance with some embodiments of the present disclosure.

FIG. 5 is a flow diagram of a method of deploying a share object for sharing usage metrics with customers, in accordance with some embodiments of the present disclosure. Method 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by resource manager 215, background service 235, local account 225, processing device 602 (FIG. 6), or a combination thereof.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

With reference to FIG. 5, method 500 begins at block 510, where processing logic transforms a usage view file into an anonymous block build file, wherein the usage view file corresponds to a view of customer usage data. In some embodiments, the usage view file is a structured query language (SQL) file and the anonymous block build file includes instrumentation code and independent SQL statements corresponding to the SQL file. In some embodiments, processing logic adds a machine learning function into the anonymous block build file, which enables the customer account to invoke on the customer usage data. In some embodiments, processing logic adds a share object version control to the anonymous block build file that indicates removal of one or more previous share objects from a cloud region. In turn, a local account executing in the cloud region removes the one or more previous share objects from the cloud region.

At block 520, processing logic embeds the anonymous block build file into a task. At block 530, processing logic executes the task to produce a share object that is based on the anonymous block build file. In some embodiments, the task is executed in the cloud region, such as by local account 225 shown in FIG. 2.

At block 540, processing logic deploys the share object to a customer account (e.g., customer accounts 260, 265, 270). The share object enables the customer account to access the view of the customer usage data. In some embodiments, the customer usage data is stored in a regional database, and processing logic instantiates, at the customer account, a customer database based on the share object. The customer database virtualizes the customer usage data stored in the regional database. In some embodiments, processing logic receives a query request at the customer account to perform a query on the customer database. Processing logic performs the query on the regional database to produce a query result and provides the query result to the customer account.

Figure 6:
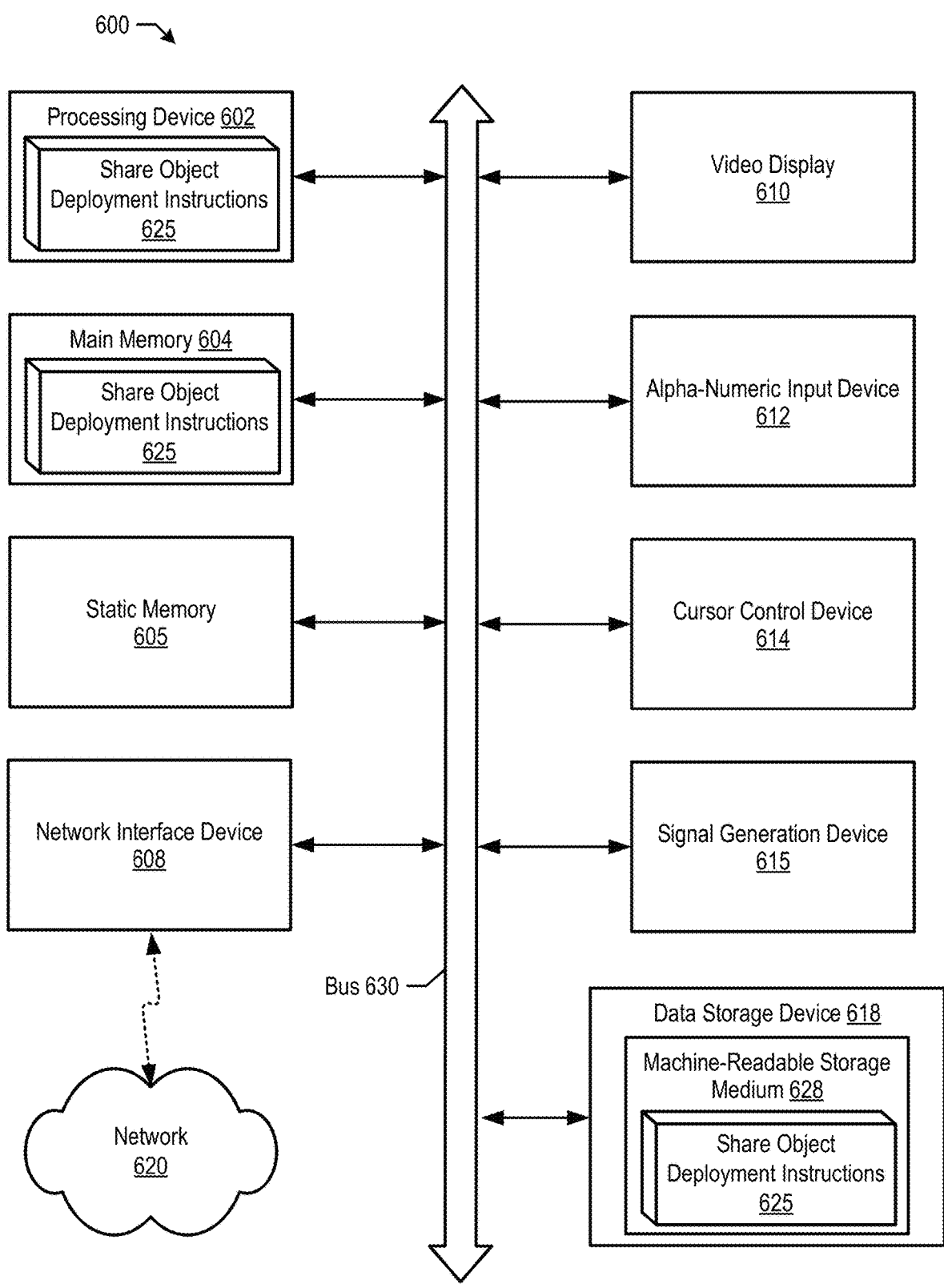
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for intelligently scheduling containers.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute share object deployment instructions 625, for performing the operations and steps discussed herein.

The data storage device 618 may include a machine-readable storage medium 628, on which is stored one or more sets of share object deployment instructions 625 (e.g., software) embodying any one or more of the methodologies of functions described herein. The share object deployment instructions 625 may also reside, completely or at least partially, within the main memory 604 or within the processing device 602 during execution thereof by the computer system 600; the main memory 604 and the processing device 602 also constituting machine-readable storage media. The share object deployment instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "transforming," "embedding," "executing," "deploying," "adding," "invoking," "removing," "detecting," "retrieving," "instantiating," "receiving," "performing," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112 (f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

transforming a usage view file into an anonymous block build file, wherein the usage view file corresponds to a view of customer usage data and the anonymous block build file comprises instrumentation code and one or more structured query language (SQL) statements generated from validating and traversing the usage view file;

embedding the anonymous block build file into a task;

executing, by a processing device, the task to produce a share object that is based on the anonymous block build file; and deploying the share object to a customer account, wherein the share object enables the customer account to access the view of the customer usage data.

2. The method of claim 1, further comprising:

adding a machine learning function into the anonymous block build file; and in response to deploying the share object, invoking, by the customer account, the machine learning function on the customer usage data.

3. The method of claim 1, wherein the share object is deployed by a local account running in a cloud region that comprises the customer account, the method further comprising:

adding a share object version control to the anonymous block build file, wherein the share object version control indicates removal of one or more previous share objects; and removing, by the local account, the one or more previous share objects from the cloud region.

4. The method of claim 3, wherein the task is executed by a background service running in the cloud region, the method further comprising:

detecting, by the background service, a new anonymous block build file stored in a global services repository;

retrieving the new anonymous block build file from the global services repository, wherein the new anonymous block build file comprises a new view of the customer usage data;

embedding the new anonymous block build file into a new task;

executing the new task to produce a new share object; and deploying the new share object to the customer account, wherein the new share object enables the customer account to access the new view of the customer usage data.

5. The method of claim 1, wherein the customer usage data is stored in a regional database, the method further comprising:

instantiating, at the customer account, a customer database based on the share object, wherein the customer database virtualizes the customer usage data stored in the regional database.

6. The method of claim 5, further comprising:

receiving a query request at the customer account to perform a query on the customer database;

passing the query from the customer account to a local account;

performing the query, by the local account, on the regional database to produce a query result; and providing the query result to the customer account.

7. The method of claim 1, wherein the usage view file is a structured query language (SQL) file, and wherein the instrumentation code and one or more SQL statements correspond to the SQL file.

8. A system comprising:

a processing device; and a memory to store instructions that, when executed by the processing device, cause the processing device to:

transform a usage view file into an anonymous block build file, wherein the usage view file corresponds to a view of customer usage data and the anonymous block build file comprises instrumentation code and one or more structured query language (SQL) statements generated from validating and traversing the usage view file;

embed the anonymous block build file into a task;

execute the task to produce a share object that is based on the anonymous block build file; and deploy the share object to a customer account, wherein the share object enables the customer account to access the view of the customer usage data.

9. The system of claim 8, wherein the processing device, responsive to executing the instructions, further causes the system to:

add a machine learning function into the anonymous block build file; and in response to deploying the share object, invoke, by the customer account, the machine learning function on the customer usage data.

10. The system of claim 8, wherein the share object is deployed by a local account running in a cloud region that comprises the customer account, and wherein the processing device, responsive to executing the instructions, further causes the system to:

add a share object version control to the anonymous block build file, wherein the share object version control indicates removal of one or more previous share objects; and remove, by the local account, the one or more previous share objects from the cloud region.

11. The system of claim 10, wherein the task is executed by a background service running in the cloud region, and wherein the processing device, responsive to executing the instructions, further causes the system to:

detect, by the background service, a new anonymous block build file stored in a global services repository;

retrieve the new anonymous block build file from the global services repository, wherein the new anonymous block build file comprises a new view of the customer usage data;

embed the new anonymous block build file into a new task;

execute the new task to produce a new share object; and deploy the new share object to the customer account, wherein the new share object enables the customer account to access the new view of the customer usage data.

12. The system of claim 8, wherein the customer usage data is stored in a regional database, and wherein the processing device, responsive to executing the instructions, further causes the system to:

instantiate, at the customer account, a customer database based on the share object, wherein the customer database virtualizes the customer usage data stored in the regional database.

13. The system of claim 12, wherein the processing device, responsive to executing the instructions, further causes the system to:

receive a query request at the customer account to perform a query on the customer database;

pass the query from the customer account to a local account;

perform the query, by the local account, on the regional database to produce a query result; and provide the query result to the customer account.

14. The system of claim 8, wherein the usage view file is a structured query language (SQL) file, and wherein the instrumentation code and one or more SQL statements correspond to the SQL file.

15. A non-transitory computer readable medium, having instructions stored thereon which, when executed by a processing device, cause the processing device to:

transform a usage view file into an anonymous block build file, wherein the usage view file corresponds to a view of customer usage data and the anonymous block build file comprises instrumentation code and one or more structured query language (SQL) statements generated from validating and traversing the usage view file;

embed the anonymous block build file into a task;

execute, by the processing device, the task to produce a share object that is based on the anonymous block build file; and deploy the share object to a customer account, wherein the share object enables the customer account to access the view of the customer usage data.

16. The non-transitory computer readable medium of claim 15, wherein the processing device is to:

add a machine learning function into the anonymous block build file; and in response to deploying the share object, invoke, by the customer account, the machine learning function on the customer usage data.

17. The non-transitory computer readable medium of claim 15, wherein the share object is deployed by a local account running in a cloud region that comprises the customer account, and wherein the processing device is to:

add a share object version control to the anonymous block build file, wherein the share object version control indicates removal of one or more previous share objects; and remove, by the local account, the one or more previous share objects from the cloud region.

18. The non-transitory computer readable medium of claim 17, wherein the task is executed by a background service running in the cloud region, and wherein the processing device is to:

detect, by the background service, a new anonymous block build file stored in a global services repository;

retrieve the new anonymous block build file from the global services repository, wherein the new anonymous block build file comprises a new view of the customer usage data;

embed the new anonymous block build file into a new task;

execute the new task to produce a new share object; and deploy the new share object to the customer account, wherein the new share object enables the customer account to access the new view of the customer usage data.

19. The non-transitory computer readable medium of claim 15, wherein the customer usage data is stored in a regional database, and wherein the processing device is to:

instantiate, at the customer account, a customer database based on the share object, wherein the customer database virtualizes the customer usage data stored in the regional database.

20. The non-transitory computer readable medium of claim 19, wherein the processing device is to:

receive a query request at the customer account to perform a query on the customer database;

pass the query from the customer account to a local account;

perform the query, by the local account, on the regional database to produce a query result; and provide the query result to the customer account.

* * * * *